Jan. 1, 1963  H. MENDELSON ET AL  3,071,639
PORTABLE RADIO RECEIVER CASING AND BATTERY HOLDER MEANS
Filed Jan. 29, 1960  2 Sheets-Sheet 1
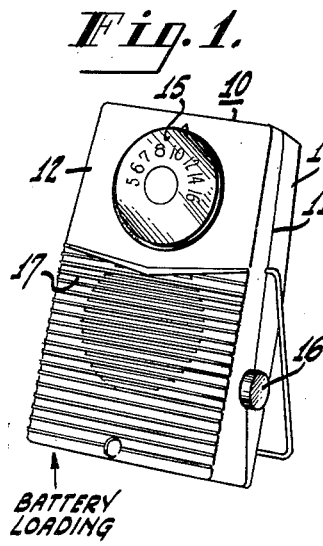
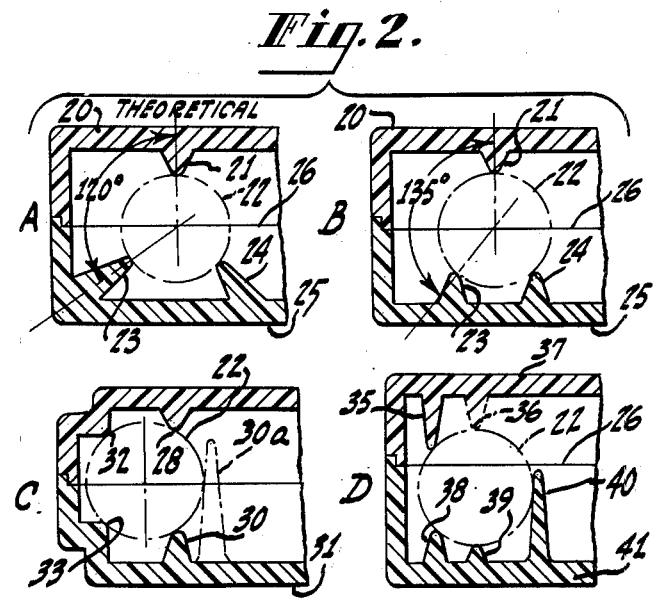
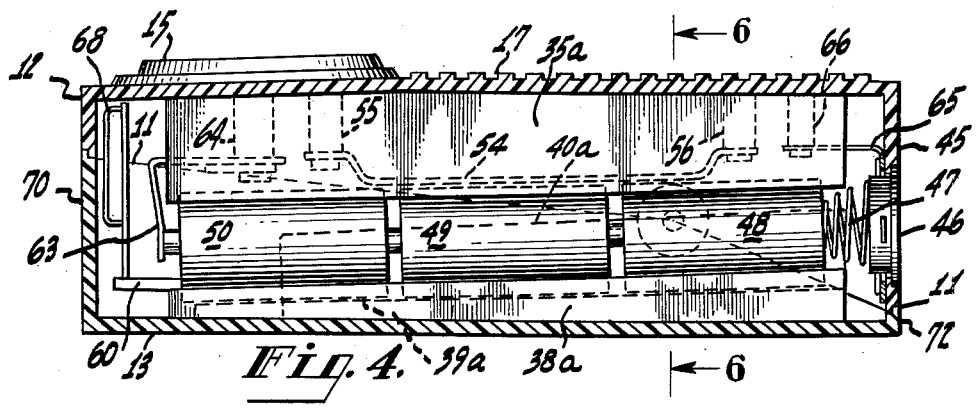
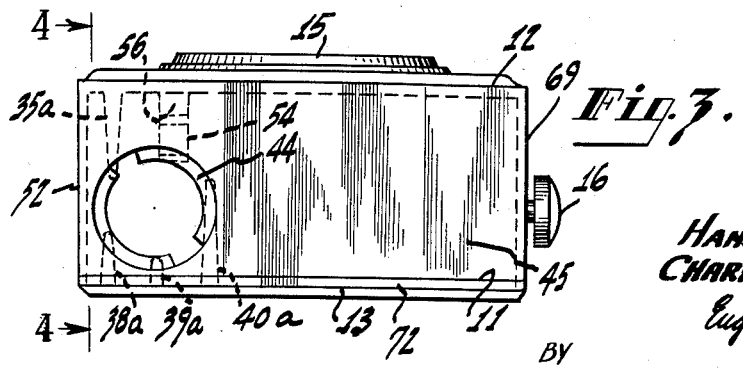
INVENTORS
HANS MENDELSON &
CHARLES I. TIGHE, JR.
BY Eugene M. Whitmore
ATTORNEY Jan. 1, 1963  H. MENDELSON ET AL  3,071,639
PORTABLE RADIO RECEIVER CASING AND BATTERY HOLDER MEANS
Filed Jan. 29, 1960  2 Sheets-Sheet 2
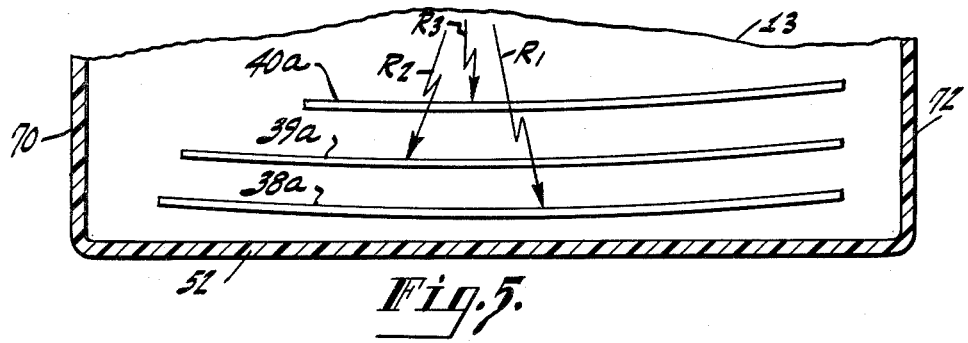
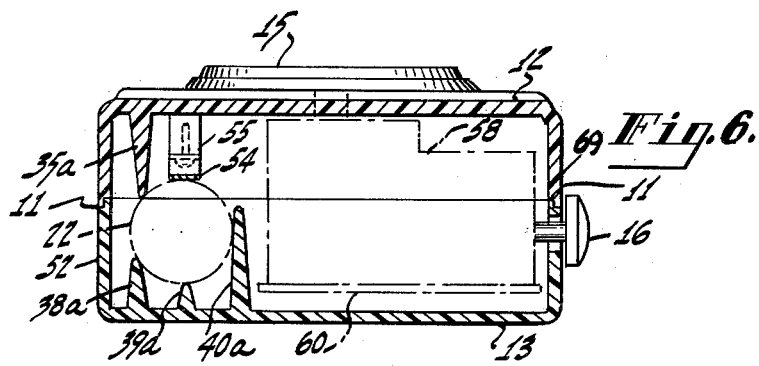
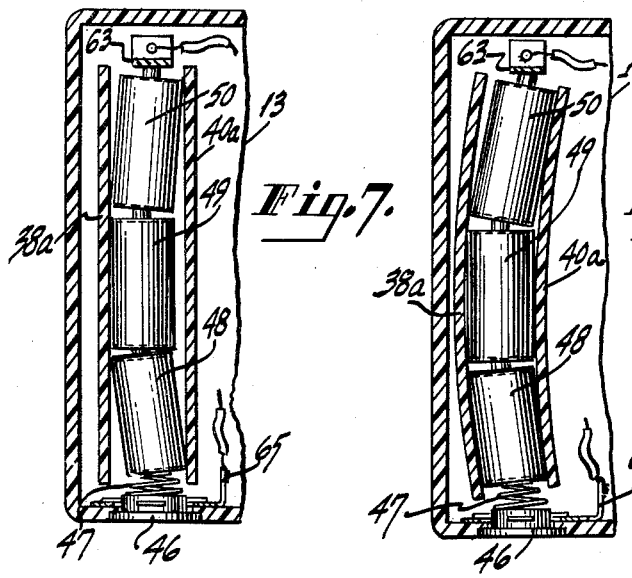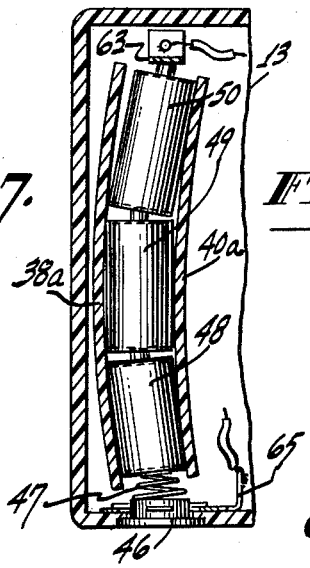
INVENTORS
HANS MENDELSON &
CHARLES I. TIGHE, JR.
BY Eugene M. Whitacre
ATTORNEY

United States Patent Office 3,071,639
Patented Jan. 1, 1963

3,071,639
PORTABLE RADIO RECEIVER CASING AND BATTERY HOLDER MEANS
Hans Mendelson, Erlton, and Charles I. Tighe, Jr., Moorestown, N.J., assignors to Radio Corporation of America, a corporation of Delaware
Filed Jan. 29, 1960, Ser. No. 5,413
4 Claims. (Cl. 136—173)

The present invention relates to small portable radio receivers, and the like, which operate on flashlight or similar small dry-cell batteries carried in the receiver casings. More particularly, the present invention relates to means for mounting and holding or positioning the battery elements in the receiver casing.

Small radio receivers and like devices are now generally transistorized whereby they may operate economically on a few flashlight cells and be housed in small molded plastic casings which are strong and light in weight and of low cost construction.

In the construction of the enclosing casings for small radio receivers of the above type, it is known that the battery elements or cells may be installed or replaced without taking the receiver casing apart or otherwise opening it. For example, the battery cells may be loaded and unloaded through a port or access-plug opening in one wall of the receiver casing directly into and from internal tubular or trough-like battery holder and mounting means such as the type shown in the patent to McCleary, 2,910,-580. This positions and holds all the battery cells in end-to-end contacting alignment and separate from the apparatus in the casing. It provides a battery loading compartment comprising an inner receptacle or holder means for the battery cells, with the loading port or access-plug opening in the casing wall aligned with the axis of the receptacle or holder means at one end thereof. A cap-like closure means is provided for the plug opening or loading port and locks in place against a spring loading contact to retain the battery in the holder means and to provide positive contact therewith.

The limited space requirements of small battery-operated receivers, such as the small radio receivers with molded plastic casings above referred to, make it desirable to reduce the size of the internal battery holder means, and, for cost reduction and ease of manufacture, to simplify the construction of the casing.

It is therefore an object of this invention to provide an improved molded plastic casing, for small battery-operated radio receivers and the like, which has a battery loading port with removable closure means therefor, and associated internal battery receiving and holding means of reduced size and low cost construction.

It is also an object of this invention to provide an improved molded plastic casing, for small transistorized radio receivers and the like, having two separable parts that may be joined to provide a unitary casing shell and internal battery receiving and holding means integral therewith, for size and cost reduction.

As mentioned above, it is desirable to reduce the size of the internal battery holding and mounting means as much as possible because of the limited space requirement. An internal tubular receptacle or trough occupies considerable space. If the battery holder means can be made an integral part of the casing, as by molding integrally therewith, no additional means is then required in the already crowded casing, for mounting or positioning and holding the battery elements.

It is therefore a further object of this invention to provide an improved casing for small battery-operated radio receivers and the like in which the battery holder function is retained while the separate battery holder and its space requirements are eliminated.

To provide an integrally mold battery positioning and holding means as part of the casing requires a consideration of the construction of the casing and of the fact that any molded object or part has to be drawn from the mold in one direction if the part is to be produced economically. To provide the shell-like structure and the hollow interior required, a molded plastic casing must have separable portions or parts and a dished or cupped construction in one part with a complementary cover part or portion, or two complementary dished or cupped parts, which readily fit together. The shell-like casing structure preferably has thin walls, and the two portions or parts fit together in complementary relation to provide an integrated casing unit having a pleasing appearance and providing suitable openings and external features adapted for tuning dial and control knob mounting and sound reproduction from loudspeaker means mounted internally thereof.

Accordingly, it is also a further object of this invention to provide a molded casing and internal battery holder means for small battery powered portable radio receivers and the like in which the casing and battery holder means may be integrally and accurately molded and withdrawn from a mold in a manner to expedite and facilitate the manufacture thereof.

In accordance with the invention, a molded plastic radio receiver casing, of the type referred to, is divided into two parts which fit together in complementary relation to provide a thin-walled unitary closed casing or shell having a portion of the internal battery holder means molded integrally with each part and arranged to define effectively an internal battery holder track in alignment with the battery loading port or plug opening, which is formed in the end of one of the casing parts. This provides for the elimination of a separate battery holder in small transistorized radio receivers and the like and thus materially contributes to a reduction in the size and cost thereof.

The battery holder means or track, per se, in accordance with the invention, is of an integral molded rib construction for engaging the periphery of the battery at angularly spaced lines of contact. It includes a series of substantially-parallel spaced ribs or like track elements of different heights integral with, and standing normal to, one wall of the casing in one part, and at least one complementary rib, or like track element, integral with and standing normal to an opposite wall of the casing in the other part. The free edges of the ribs are thus positioned in opposed relation to define an elongated cylindrical battery holding and mounting means axially aligned with the loading port. The ribs are preferably all curved on relatively long radii having essentially a common center to aid in reducing battery contact noise as will hereinafter appear.

The invention will further be understood, and further objects and advantages thereof will be seen, from the following description when considered in connection with the accompanying drawings, and its scope is pointed out in the appended claims.

In the drawings:

FIGURE 1 is a view, in perspective, of a small radio receiver having a two-part molded casing constructed in accordance with the invention;

FIGURE 2 is a cross-sectional view, partly broken away, of each of four different receiver casings of the type shown in FIGURE 1, schematically illustrating a principal feature of the invention with respect to the battery holding means;

FIGURES 3 and 4 are end and sectional side views, respectively, of the receiver of FIGURE 1 showing further details of construction of the casing and battery holding means in accordance with the invention, the sectional side view of FIGURE 4 being taken on the sectional line 4—4 of FIGURE 3;

FIGURE 5 is a top view of the lower part or portion of the casing of FIGURES 3 and 4, further showing the construction and arrangement of certain of the battery holding elements thereof in accordance with the invention;

FIGURE 6 is an enlarged cross-sectional view of the receiver casing of FIGURES 3 and 4, taken on the section line 6—6 of FIGURE 4, showing the complementary relation and arrangement of the two parts of the casing shell and of the integral battery holding elements thereof in greater detail; and, FIGURES 7 and 8 are like cross-sectional plan views representative of a portion of the receiver casings and battery holder to schematically illustrate a feature of the invention relating to the battery cell alignment therein.

Referring to the drawings, and particularly to FIGURE 1, a small radio receiver 10, of the battery-operated, transistorized type, is provided with a two-part molded casing which is divided along a line 11 into a frontal or cover portion 12 and a base or rear portion 13. These fit together in complementary relation to each other, as shown, to provide a unitary casing structure having a hollow interior for the radio equipment and battery. The receiver is provided with the usual external tuning dial 15 and volume control knob 16, and a loudspeaker (not shown) is located behind a grille 17 on the front portion 12 of the casing.

This receiver, being of the transistorized type, operates on small flashlight type cells which are loaded and/or replaced through a loading port or access plug opening in one end of the casing. The location of this opening, shown in other figures of the drawing, is indicated by the arrowed legend below the receiver in FIGURE 1. The internal battery holding means, in association with the loading port or opening within the casing, is integral with the casing and is of a ribbed construction arranged to define an effectively cylindrical battery holding track having a cross-sectional configuration characteristic of those schematically illustrated in FIGURE 2, to which attention is now directed along with FIGURE 1.

It may be assumed that the four sectional views shown are taken on a section line extending transversely of a receiver casing like that of FIGURE 1 so that, in each of the four portions of FIGURE 2, a front or base portion and a back or cover portion of a two part molded casing are illustrated as joined to provide a closed thin-walled casing or shell having a hollow interior.

In FIGURE 2A, which is theoretical in its showing as will be seen, one part 20 of the casing, which may be considered as the front or base portion, is provided with a single integral upstanding rib 21 for engaging, along its edge, a cylindrical battery which would occupy the space outlined by the dot and dash circle 22. Two other ribs 23 and 24 are provided in the other part 25 of the casing, which may be considered to be the back or cover portion. These two portions of the casing are separable along a line or plane 26 and when arranged as shown provide a three point support for the battery which would occupy the space 22. For this purpose the ribs 23 and 24 are spaced 120° from the rib 21 and are necessarily arranged to lie in radial directions to provide three uniformly spaced points or lines of contact effectively with the cylindrical battery holding space.

This theoretical rib arrangement is not adapted for integral molded construction with the casing parts, for the reason that the ribs 23 and 24 could not be drawn integral with the casing part 25 from any mold normally used for low cost manufacture.

A practical arrangement, in accordance with the invention, is shown in FIGURE 2B in which the rib 21 is retained in the same position in the casing part 20 while the ribs 23 and 24 are now moved somewhat closer together and stand vertically or normal to the casing wall of the part 25. In this case the angular relation with respect to the rib 21 may be increased, as shown, although the same equalized angular relation could be retained, as is obvious. In any case, the three point support is made such that a cylindrical battery occupying the space 22 may be held from shifting transversely of the casing by the ribs 21, 23 and 24. These effectively provide a cylindrical retaining and holding track within the casing in which the edges of the ribs contact the battery elements or cells linearly lengthwise thereof at their peripheries.

It will be seen that since the ribs 21, 23 and 24 stand vertically or are normal to the front and back walls of the casing as shown, each part of the casing is adapted to be molded with the ribs integral therewith since that each part may readily be drawn from the mold in one direction. The tapered cross section of the ribs aids in this respect.

While a minimum of three angularly spaced ribs are required, in accordance with the invention, to define a battery holding track, equivalent means may be provided by different casing configuration and arrangement to define the battery holding track, as shown, for example, in FIGURES 2C and 2D. In FIGURE 2C, four points of contact or support are provided with respect to the circular battery area 22. These comprise a rib 28 in one part 29 of the casing and a second rib 30 opposing and similar to the rib 28, in the other part 31 of the casing. Two rib elements 32 and 33, formed in the walls or corners of the casing portions 29 and 31, complete the four-point support arrangement. The rib elements 32 and 33 in this case are located at points which are substantially uniformly spaced angularly with respect to the ribs 28 and 30. This is a space saving arrangement in that the casing itself may be conformed externally to the interior rib construction and thereby be of smaller size.

Often the battery elements of a receiver are so closely associated with other apparatus and wiring in the casing that the loading and replacement of the battery cells would be difficult without some fixed barrier between the area to be occupied by the battery and the remainder of the space in the receiver casing. Accordingly, as indicated in FIGURE 2C, the rib 30 may be replaced or supplemented by a rib 30a, shown in dotted lines, which would extend vertically from the wall of the casing part 31 tangentially of the battery space 32 and into the upper portion of the casing interior, thereby to provide a barrier between the battery space 22 and the apparatus space to the right thereof as viewed in the drawing. In certain cases both ribs 30 and 30a may be used if desired.

However, a principle relating to the rib arrangement in accordance with the invention, as seen from the theoretical arrangement of FIGURE 2A, is that at least three points of support or guidance are provided for the battery along the length of the ribs. These points of support are spaced angularly so that a track or guiding and holding means is provided from which the battery elements cannot slip transversely. In this respect, the battery points or lines of contact are always spaced so that the minimum rectilinear distance between them is less than the diameter of the battery being held. Secondly, the rib construction must be such that the rib elements stand normal to the casing wall with which they are joined whereby the casing side and rib elements may be drawn from a mold in the same direction.

Referring to FIGURE 2D, a casing and rib construction is shown in which a plurality of substantially parallel ribs 35 and 36, in one portion 37, are provided in opposing and complementary relation to three ribs 38, 39 and 40 in the other portion 41 of the casing, to define a cylindrical battery holding track area 22 as in the preceding examples. In this case however, the rib 40 not only serves to retain the battery elements in the track or holder area but also aids in separating apparatus and wiring from the battery area in order that the loading and unloading of the battery elements may be substantially unimpeded.

It will be noted that the ribs 35 and 38 are spaced from the casing side walls and all of the ribs are spaced in such a manner that any necessary wiring in the battery portion of the receiver casing can be run through the trough like areas between the ribs and between the ribs and the wall without interfering with the free area within the circle 22. The rib 36 is shown in dotted outline to indicate that this or other ribs may be replaced by circuit elements, brackets, or chassis elements on the enclosed apparatus, to provide a track element for the battery holder means, as will hereinafter appear.

All of the cabinet structures represented in FIGURE 2 are of the two-part or cover-and-base type separable along the line 26 as indicated. In accordance with the invention, the two parts fit together in complementary relation to provide a unitary, closed casing or shell having an internal battery holding means molded integrally with each part of the casing in a series of parallel ribs or rib elements arranged in opposing relation to each other in the two parts of the casing to define effectively an internal battery holder track which is aligned and communicates axially with a battery loading port or plug opening in one end of the casing.

The manner in which this is done in practice for the commercial type receiver shown in FIGURE 1, will be seen from a consideration of FIGURES 3–6 inclusive to which attention is now directed along with FIGURE 1.

The casing is divided along the line 11 which forms the junction of the two parts 12 and 13, the part 12 being the base or front of the cabinet and the part 13 being the back or cover of the cabinet. The front or base carries the apparatus of the receiver and the back or cover does not carry any apparatus. It will be noted, in FIGURE 3, that a circular battery loading port 44 is provided in the bottom end 45 of the casing which is integral with the part 12, the joint 11 in FIGURE 3 being near the bottom thereof as viewed in the drawing. As shown in FIGURE 4, the opening 44 is provided with a cap-like closure means 46 which locks in place against a spring loading contact 47 to retain a battery, comprising three cells 48, 49 and 50, in the interior holder means to be described, in the end-to-end contacting relation shown.

The parallel-rib construction is similar to that shown in FIGURE 2D and comprises a rib 35a in the part 12 and three ribs 38a, 39a and 40a in the part 13, all in substantially parallel relation with the side wall 52 and with each other in the back portion 13 of the casing. In the front portion 12, a metallic guide strip 54 is provided between two studs 55 and 56 as part of the battery holding means or loading track in place of a rib as shown in FIGURE 6. This is a modification as discussed in connection with the rib 36 of FIGURE 2D. Where any apparatus is required to be in a position which would otherwise be taken by a rib, the apparatus may be arranged to assist in providing a guiding and holding element for the battery loading track.

Also, in FIGURE 6, the receiver apparatus 58, which may have a printed-circuit chassis board 60, is outlined to the right of the barrier rib 40a. Since such apparatus is well known and does not concern the invention, further illustration and description is not believed to be necessary.

The battery cells 48, 49 and 50 are resiliently biased by the contact spring 47 into engagement with a rear contact 63 mounted on a stud 64 in the front portion 12 of the casing. The contact 47 connects with a fixed contact 65 which is carried by a similar stud 66 in the casing front portion 12 near the loading port. Circuit connections (not shown) with the contacts 63 and 65 convey operating current from the battery to the receiver apparatus. In FIGURE 4 also, one end of the printed chassis board 60 is shown, on which is mounted a ferrite loop antenna 68.

From the foregoing description it will be seen that the receiver casing is a thin-walled molded shell separable into two complementary parts along a predetermined line or plane, and comprises front and back walls individual to the front and back or base and cover portions 12 and 13. It further comprises end walls 70 and 45, and side walls 52 and side wall 69 which are all common to both of the parts 12 and 13 of the casing. In operation of the present receiver, the end walls 70 and 45 function respectively as the top and bottom of the casing. As shown more clearly in FIGURE 3, only a small portion 72 of the bottom or end wall 45 is provided on the part 13 due to the location of the loading port 44 in the main area of the wall 45 which is carried by the casing port 12.

This construction provides a low-cost casing and battery holding or positioning means of the molded plastic type which consists essentially of a unitary separble two-part casing comprising a cover portion and a base portion of cup shaped section as shown more clearly in FIGURE 6, having relatively thin side wals common to both portions or parts of the casing, and having individual front and back walls for the cover and base portions or parts, respectively, integral with the side walls, and a plurality of elongated thin ribs integral with the casing parts and arranged in substantially parallel relation to each other and the casing walls to be easily withdrawn therewith from the molds.

The ribs 38a, 39a and 40a, in the cover or back part 13, are shown in FIGURE 5 in plan to indicate the curvature of these ribs on relatively long radii R1, R2 and R3 from a common center of curvature. The rib 35a in the front part of the casing, corresponding to the rib 38a, is likewise curved on the same radius R1. This construction is a further feature of the invention since any battery holder means of this type must provide a loading port or opening and receptacle means which are both of a diameter and size to freely receive the cylindrical dry-cell battery elements, that is, they must be slightly greater in diameter than the diameter of the battery elements used in the receiver. Thus, when arranged in end-to-end contacting relation in a holder, the middle element or cell of a three-cell battery tends to deflect or shift, due to the clearance or larger diameter of the holder means, and produce electrical contact noise. Curving the retaining track establishes a definite battery deflection with resultant minimum battery rattle and electrical noise when in use as will be seen with reference to FIGURES 7 and 8.

In FIGURE 7, a portion of the cover part 13 may be considered as represented in cross section, with the elongated ribs 38a and 40a shown schematically as being straight or recti-linear. The battery cells 48, 49 and 50 and shown compressed between the spring contact 47 and the rear contact 63. It will be noted that the center cell 49 tends to deflect due to the clearance provided in the battery holder between the ribs 38a and 40a, which, as above noted, is necessary for smooth loading and unloading of the battery cells from the casing without binding. This clearance is shown as enlarged in this schematic representation, in order to illustrate more clearly the manner in which the center or middle cell can shift in operation and thus cause contact noise. In the position shown in FIGURE 7, the middle cell 49 can shift to the right between the end cells and may thus cause contact noise in the receiver circuits connected with the battery.

If, however, the battery holder ribs are curved as shown in FIGURE 8 on relatively long radii from a common center, they will tend to hold the battery cells in a fixed condition of deformation from which they cannot shift to cause contact noise. Thus by curving the retaining track or holder, as shown schematically in FIGURE 8, to establish a definite battery cell deflection, minimum battery rattle or shift and electrical noise is obtained in operation.

From the foregoing description, it will be seen that the two-part molded casing and integral battery track of the present invention provides a desirable size reduction over known battery holding casings for small radio and like apparatus, and a simplified construction for cost reduction and ease of manufacture. Thus it is adapted for use with small transistorized radio receivers as a means for reducing the size and cost thereof.

What is claimed is:

1. A molded casing for small battery-operated radio receivers and the like comprising, two separable front and back parts providing a unitary casing shell having relatively thin walls and a battery loading port in one of said walls, and internal battery receiving and holding means integral with said casing, said battery receiving and holding means including a series of substantially-parallel spaced rib elements integral with one wall of the casing in one part and at least one complementary rib element integral with an opposite wall of the casing in the other part, the free edges of the rib elements being positioned in opposed relation to define an elongated effectively cylindrical battery track axially aligned and communicating with the loading port, and the rib elements further being curved on relatively long radii having essentially a common center to deform the track in one direction.

2. The combination with a casing for a portable battery operated electrical apparatus, of a battery compartment therefor, comprising an elongated receptacle extending along one wall of the casing and having a cross-sectional dimension to receive and hold a plurality of battery elements in end-to-end contacting alignment, said receptacle being curved along the longitudinal axis thereof to establish a definite battery cell deflection to minimize the shifting of said battery units in said receptacle, contact means at both ends of said receptacle for resiliently contacting the end battery units of said plurality of battery units, and means providing a loading port for the compartment in an adjoining wall of the casing in alignment with said receptacle for inserting new battery units in and withdrawing used battery units from the receptacle without opening the casing.

3. A battery-holding radio receiver casing of the type having a circular battery loading port in one wall thereof comprising, two separable front and back casing parts providing a thin-walled unitary shell for housing radio receiver apparatus and battery means therefor of the flashlight multi-cell type, means including a plurality of elongated rib elements integral with the casing providing an internal cylindrical battery receiving and holding track axially aligned and communicating with said loading port, said rib elements being positioned in opposed relation with the free edges thereof angularly spaced to define said track and to contact the battery elements linearly lengthwise thereof at the peripheries, and means for holding a plurality of battery elements in contacting end-to-end relation in said track within the casing, said rib elements being curved on a relatively long radii having essentially a common center, thereby to provide curvature in said track for holding said battery elements from shifting transversely and changing their contacting relation in operation.

4. A battery-holding radio receiver casing of the type having a circular battery loading port in one wall thereof comprising, two separable front and back casing parts providing a thin-walled unitary shell for housing radio receiver apparatus and battery means therefor of the flashlight multi-cell type, means including a plurality of elongated rib elements integral with the casing providing an internal cylindrical battery receiving and holding track axially aligned and communicating with said loading port, said rib elements being positioned in opposed relation with the free edges thereof angularly spaced to define said track and to contact the battery elements linearly lengthwise thereof at the peripheries, one of said rib elements providing a barrier between the cylindrical battery track and the radio apparatus portion of the interior of said casing, and means for holding a plurality of said battery elements in contacting end-to-end relation in said track within the casing, said rib elements being curved on relatively long radii having essentially a common center, thereby to provide curvature in said track for holding said battery elements from shifting transversely and changing their contacting relation in operation.

References Cited in the file of this patent

UNITED STATES PATENTS

| | | |
|---|---|---|
| 2,431,518 | Stigler et al. | Nov. 25, 1947 |
| 2,579,762 | Schofield | Dec. 25, 1951 |
| 2,605,385 | Levinson | July 29, 1952 |
| 2,910,580 | McCleary | Oct. 27, 1959 |